United States Patent [19]

Mochizuki et al.

[11] Patent Number: 5,319,459
[45] Date of Patent: Jun. 7, 1994

[54] METHOD AND APPARATUS FOR CHECKING DEFECT ON DISPLAY SCREEN

[75] Inventors: Jun Mochizuki, Fujisawa; Atsushi Yoshida, Yokohama; Toshio Asano, Yokohama; Kinuyo Hagimae, Yokohama; Daisuke Katsuta, Yokohama; Teruo Matsuo, Mobara; Kazuo Majima, Mobara; Masao Taniguchi, Mobara, all of Japan

[73] Assignee: Hitachi, Ltd., Tokyo, Japan

[21] Appl. No.: 857,662

[22] Filed: Mar. 26, 1992

[30] Foreign Application Priority Data

Mar. 29, 1991 [JP] Japan .................. 3-065964

[51] Int. Cl.⁵ .......................................... H04N 17/04
[52] U.S. Cl. ........................................ 348/189
[58] Field of Search ........... 358/139, 163, 10, 213.17, 358/106, 230, 56; H04N 17/04

[56] References Cited

U.S. PATENT DOCUMENTS 4,454,541 6/1984 Duschl .................. 358/139 X
4,701,784 10/1987 Matsuoka et al. ........ 358/213.17
4,761,685 8/1988 Asaida et al. ............ 358/139

Primary Examiner—Victor R. Kostak
Attorney, Agent, or Firm—Antonelli, Terry, Stout & Kraus

[57] ABSTRACT

An apparatus for identifying positions of pixel defects on a display screen, such as a cathode-ray tube or a liquid crystal display, operates to pick up an image signal of a display screen representing a predetermined image with an imaging camera, shift the image signal of the imaging camera by one pixel in one and another directions with respect to the display screen, and obtain a difference of a signal level between a defective portion and a normal portion on the screen, based on the signals obtained when the image signal of the imaging camera is shifted in one and another directions. The apparatus also serves to calculate a relative inclination between the imaging camera and the display screen for obtaining a difference of a signal level between a defective portion and a normal portion of each pixel. The results make it possible to clearly identify the difference of the signal level between the defective portion and the normal portion.

9 Claims, 6 Drawing Sheets

METHOD AND APPARATUS FOR CHECKING DEFECT ON DISPLAY SCREEN

BACKGROUND OF THE INVENTION

The present invention relates to a method and an apparatus for detecting a defect in an image on a display screen, that is, a pixel having a higher or lower luminance than the other pixels.

One example of a method for detecting a jammed shadow mask of a color cathode-ray tube (CRT) is described in JP-A-63-42454 "Method for checking a Shadow Mask on a CRT". This method is designed to detect a jammed shadow mask based on the difference between an original image and an image where shadow mask holes are shifted from the original image by one pitch.

The foregoing prior art operates to check for an abnormal shadow mask based on an original image and another image where shadow mask holes are shifted from those of the original image by one pitch for the purpose of detecting a jammed shadow mask hole on a color CRT. This arrangement makes it difficult to obtain a difference in signal level between a normal portion and an abnormal portion output from an imaging camera if a hole suffers from a slight abnormality, thereby being making it substantially impossible to realize stable detection. Further, the prior art operates on the assumption that no relative inclination exists between the imaging camera and a CRT to be checked. Hence, the prior art has a disadvantage that it is quite difficult to offset the adverse effect of the inclination.

SUMMARY OF THE INVENTION

It is an object of the present invention to provide a method and an apparatus for checking for a defect on a CRT or an LCD display. The method and apparatus are capable of stably detecting a difference in signal level between a normal portion and an abnormal portion output from an imaging camera.

It is a further object of the present invention to provide a method and an apparatus for stably detecting a defect without being adversely affected by moire fringes appearing between the pixels of a display screen to be checked and the pixels of an imaging camera, foreign matter like dirt on the display screen, bubbles formed inside of a glass plate between the display screen and the pixels, and the relative inclination between the display screen and the imaging camera.

It is another object of the present invention to provide a method and an apparatus for checking for a defect on the overall screen of the display to be checked.

In carrying out the foregoing objects, the detecting method and apparatus according to the present invention are arranged to pick up an image on a display screen with an imaging camera and detect a pixel defect and a dotted defect based on a difference between a signal of an image where a brightness of the picked-up image is doubled and another image signal indicating a sum of the signals of the images where an image signal of the imaging camera is shifted by one pitch corresponding to the display screen to one direction to another, for the purpose of reliably obtaining a difference of a signal level between a normal portion and an abnormal portion output by the imaging camera.

In order to prevent detection leakage or erroneous detection of a defect resulting from moire fringes appearing between the pixels of the display screen and the pixels of the imaging camera, foreign matter, such as dirt on the display screen or bubbles formed inside of a glass plate between the display screen surface and the pixels, the checking method and apparatus are arranged to pick up an expansive image of the display screen to be checked with the imaging camera so that the pixels of the display screen may become sufficiently larger than the pixels of the imaging camera for the purpose of suppressing appearance of moire fringes and to make the depth of field shorter for the purpose of preventing an optical focal point from being formed on a foreign matter or a bubble.

To realize a stable detection without being adversely effected by the relative inclination between the display screen to be checked and the imaging camera, the checking method and apparatus are arranged to obliquely shift the image signal of the imaging camera, connect the variable-length delay memories in two-stage cascade, set the delay amount of each memory in common for implementing the oblique shifting process, and at a time to carry out the Fourier transform with respect to the brightest horizontal line inside of any square area of an imaging field of the imaging camera, store the brightness variation on the line as power spectra corresponding to spatial frequencies of the variation and a real part and an imaginary part of the Fourier transform corresponding to each spatial frequency, extract the spatial frequency corresponding to the second largest power spectrum among the spectrum generated from the range of the pixels as a spatial frequency corresponding to the brightness variation generated by the relative inclination, that is, a beat frequency, calculate an absolute value of an inclined angle from a value of the beat frequency, determine a phase lead or lag in the beat frequency of the brightness horizontal line and a horizontal line closest to it from a sign of an exterior product of a vector defined by a real part and an imaginary part of the Fourier transform in the beat frequency about the horizontal line closest to the brightest horizontal line and a vector defined by a real part and an imaginary part of the Fourier transform in the beat frequency about the brightest horizontal line, determine a sign of the inclination based on the phase lead or lag, and define the shifting amount in the oblique direction according to the relative inclination between the display screen to be checked and the imaging camera.

To detect a defect on an overall screen of the display to be rapidly checked, a plurality of detecting systems are located on the overall screen of the display to be checked so that each system can detect a defect at a time. To realize the detecting system which does not need to increase the number of the detecting systems according to the size of the display screen, one or more detecting systems are prepared so that the detecting system(s) may be moved over the overall surface of the display screen by means of a table or a robot.

The difference between the image signal where the brightness of the image picked up by the imaging camera is doubled and a sum of the image signal of the image is shifted by one pixel of the display screen to one direction to another has a larger value in a defective portion on the screen in comparison to the difference between an image and another image where the image signal is shifted by one pixel. This results in clearly identifying the difference in signal level between a defective portion and a normal portion on the screen, thereby making it possible to detect even a subtle defect on the screen with superior sensitivity and stability. The display screen is expansively imaged by the imaging camera so that the pixels of the display screen may be far larger than those of the imaging camera for the purpose of suppressing appearance of moire fringes. Further, the field of depth of the imaging optical system is made shorter for preventing a focal point from being formed on foreign matter or a bubble. The detecting system of this embodiment, therefore, is capable of clearly identifying a difference in signal level about a defect having a lower luminance than the relatively gloomy portion of the moire fringes or a defect having a higher luminance than the relatively bright portion of the moire fringes for the purpose of suppressing the detection leakage and preventing the foreign matter or a bubble having the same size of the defect from being erroneously detected as a low-luminance defect.

Further, the oblique shifting process makes it possible to amend the relative inclination between the display screen to be checked and the imaging camera. Moreover, the detecting system of this embodiment is arranged to connect the variable-length delay memories in two-staged cascade and set the delay amount of each memory in common for the purpose of implementing the oblique shifting process. Hence, it does not need a large amount of processing time unlike the oblique shifting process done by a program. For measuring the inclination, a Fourier transformation is used. Hence, a highly accurate measurement is made possible. Moreover, the horizontal lines needed within a field of view is as few as two, so that the measuring time is made shorter.

Since a plurality of detecting systems are allowed to be operated at the same time, a highly accurate as well as rapid detection can be realized. In addition, the movable detecting system makes it possible to check the large-sized screen of the display without having to increase the total number of the detecting systems.

DESCRIPTION OF THE PREFERRED EMBODIMENTS

Herein, an embodiment of the present invention will be described when referring to FIGS. 1 to 7.

Figure 1:
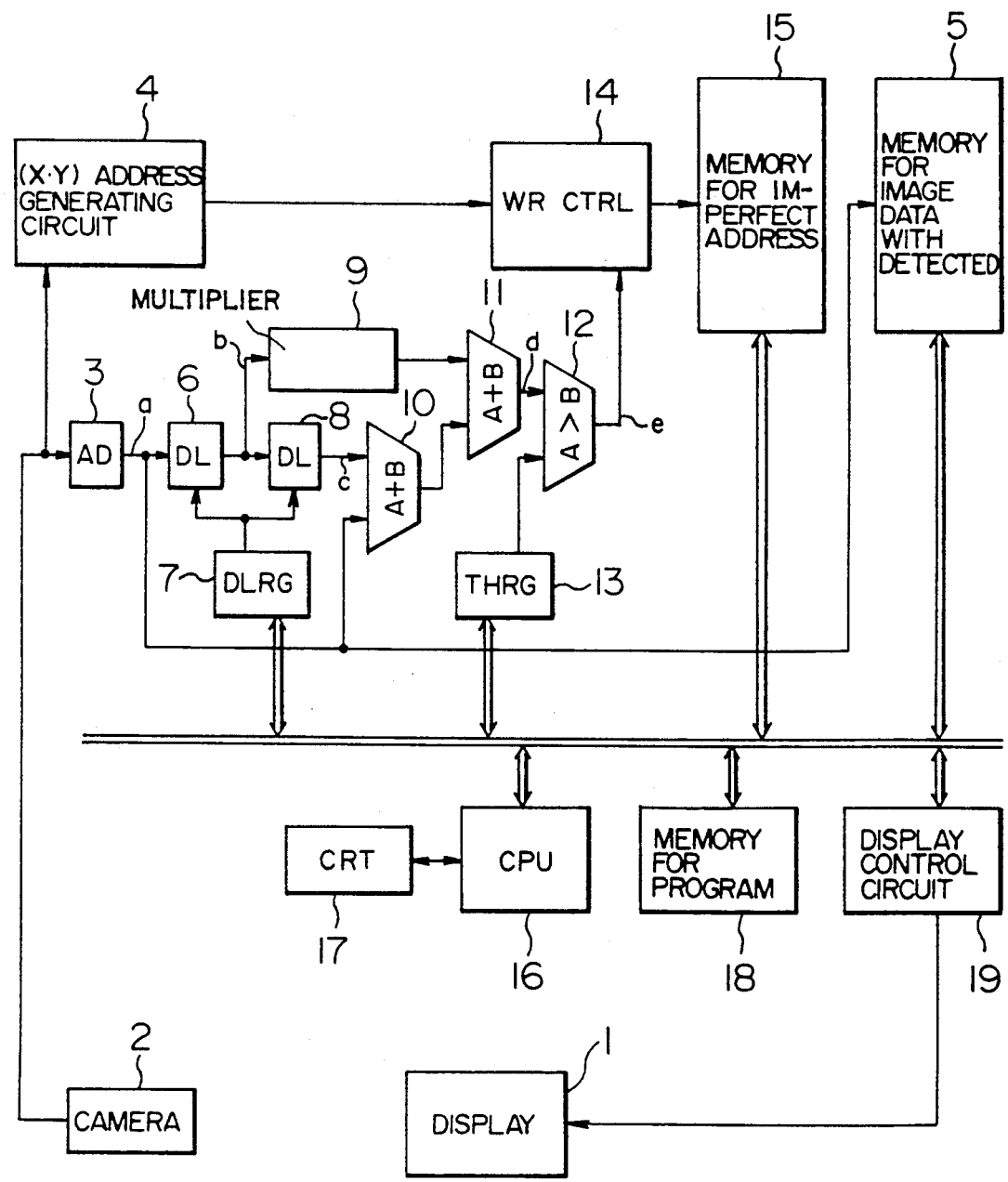
FIG. 1 is a block diagram showing an apparatus for checking for a defect on a display screen according to an embodiment of the present invention.

FIG. 1 shows an apparatus for checking for a defect on a display screen according to the embodiment of the invention. The shown apparatus is arranged to detect a defect having a lower luminance than the portion around it. Reference numeral 1 denotes a display screen to be checked, which screen is imaged by an imaging camera 2. A video signal and a synchronous signal are supplied from the imaging camera 2 to an analog-to-digital (A/D) converter 3 and an (X,Y) address generating circuit 4. The A/D converter 3 serves to produce a digital video signal a and the (X, Y) address generating circuit 4 serves to generate a horizontal (X) address and a vertical (Y) address of the current input video signal a on the imaging screen. The digital video signal a is stored in a memory 5 and a variable-length delay memory 6. The memory 5 stores the image data with the detected inclination. From the delay memory 6, a video signal b is output. The video signal b is a digital video signal which is delayed by a delay amount predetermined in a delay register 7. That is to say, the video signal b is delayed by the delay amount and is digitized. The video signal b is stored in the variable-length delay memory 8 and is also input to a (−2)-multiplying circuit 9. The (−2)-multiplying circuit 9 shifts digital data to one direction by one bit (that is, making the digital data two times), then makes a complement of 2 with respect to the digital data (that is, changing the digital data to negative). The complement is then inverted and is also incremented by 1. Hereinafter, the delay amount predetermined in the delay register 7 is referred to as one delay. A video signal c is a digital video signal which is delayed from the video signal b by one delay. The video signal c is input to one input of an adder 10. The digital video signal a without delay is input to the other input of the adder 10. The adder 10 supplies as an output a sum of a level of an undelayed digital video signal and a level of a digital video signal c delayed by two delays from the video signal a. This output of the adder 10 is applied to one input of an adder 11. The signal applied to the other input of the adder 11 is a (−2)-multiplied video signal b delayed from the digital video signal a by one delay. An output signal d of the adder 11 keeps the predetermined signal level. The signal level corresponds to the sum of the level of the digital video signal a and the level of the digital video signal c delayed by two delays from the video signal a from which sum is subtracted the doubled level of the digital video signal b delayed from the video signal by one delay. The output signal d is applied from the adder 11 to a comparator 12. The comparator 12 serves to send out a write enable signal e to a write control (WR CTRL) circuit 14 by the exceeded amount of the output signal d rather than the threshold value predetermined in a threshold register (THRG) 13. The write control (WR CNTRL) circuit 14 writes in a memory 15 the (X, Y) address of a defective pixel given in the case that the signal output d of the adder 11 is equal to or larger than a predetermined threshold value. The memory 15 is prepared to store the address of a defective pixel. The overall system is controlled by a central processing unit (CPU) 16, which is connected to a cathode-ray tube (CRT) 17 for displaying the result of operating the system. A program to be executed by the CPU and the necessary data for the execution are stored in a memory 18. The memory 18 is prepared to store a program and its relevant data. Patterns appearing on the display screen 1 are controlled by a display control circuit 19 under the control of the CPU 16. In the detection for defects on the screen, as used by this invention, the patterns are those where all the pixels keep uniform luminance on the display screen 1 to be checked.

Figure 2A:
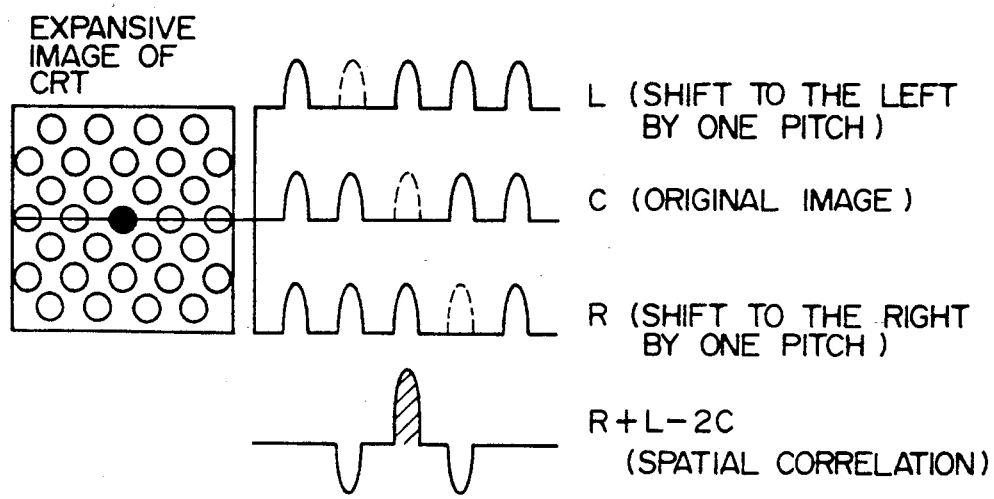
FIG. 2A is a principle view showing an apparatus for checking for a defect on a CRT screen in a horizontal shifting manner.
Figure 2B:
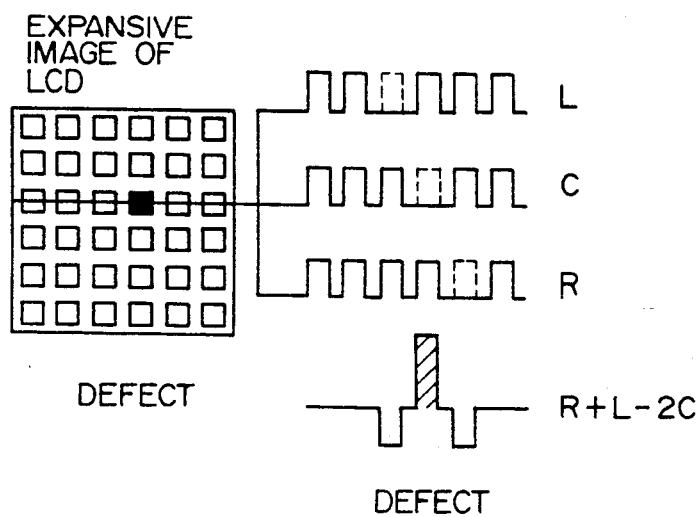
FIG. 2B is a principle view showing an apparatus for checking for a defect on a LCD screen in a horizontal shifting manner.

FIGS. 2A and 2B show the operation principle, on which a defect having a lower luminance than the portion around it is detected in a horizontal shifting manner. The operation principle shown in FIG. 2A is for a CRT and that shown in FIG. 2B is for a LCD. When the calculation of $R+L-2C$ is executed at each pixel of the imaging camera, the signal level of the defective pixel is made remarkably larger, wherein L denotes a signal of an image whose pixels are shifted to the left hand by one pitch, R denotes a signal of an image whose pixels are shifted to the right hand by one pitch, and C denotes a signal of an original image. The remarkably larger image signal $R+L-2C$ results in being able to clearly identify the difference of a signal level between a defective portion and a normal portion on the screen, thereby allowing a subtle defect to be detected stably and with good sensitivity.

In the following description, the signal shown in FIG. 2A corresponds to the apparatus for checking for a defect on the screen shown in FIG. 1. The original image signal C corresponds to the digital video signal b. The image signal L corresponds to the digital video signal a. The image signal R corresponds to a digital video signal c. The signal of $R+L-2C$ corresponds to the output signal d of the adder 11. FIG. 2A shows the operation principle for the CRT and FIG. 2B shows the operation principle for the LCD on the condition that the pixels of the imaging camera are far smaller than those of the display screen. This condition is not indispensable to the detection of a defect in a horizontal shifting manner.

In the case that each pixel of the display screen has the same size as that of the imaging camera, the defect is allowed to be detected according to the foregoing process. In the case that each pixel of the imaging camera is larger than that of the display screen, the pixel of the imaging camera is likely to have a lower signal level than the adjacent pixels. Hence, the defective pixel is also allowed to be detected according to the foregoing process. In this case, however, it is not necessary to shift the pixel ranges on the display screen by one pitch and the shifting amount can be varied in a certain range. However, two advantages are provided if the pixel of the imaging camera is smaller than that of the display screen as shown in FIGS. 2A and 2B. One advantage is to prevent more fringes from appearing between the pixels of the display screen and those of the imaging camera. This advantage provides an effect of clearly identifying the difference of the signal level between the relatively gloomy portion of the moire fringes and the defect having the lower luminance than the gloomy portion or between the relatively bright portion of the moire fringes and the defect having the higher luminance than the bright portion and of suppressing the detection leakage. The other advantage is to prevent a focal point of an optical system from being formed on foreign matter, such as dirt on the surface of the display screen or a bubble formed inside of the glass plate between the surface of the display screen and the pixel, by making the depth of a focal point of the optical system shorter. This advantage provides an effect of avoiding erroneous detection of foreign matter or a bubble having the same size as the defect on the screen as a defect having the lower luminance than the pixels around the defect.

Herein, the description will be directed to the process of checking for a defect having a higher luminance than the portion around the defect in the horizontal shifting manner. Referring to FIGS. 2A and 2B, by changing $R+L-2C$ to $2C-(R+L)$, the signal level of the defect on the screen is made remarkably larger than that of the portion around the defect. This results in being able to clearly identify the difference of the signal level between the defective portion and the normal portion on the screen, thereby obtaining a similar result as the above. To implement this in the arrangement shown in FIG. 1, it is just necessary to replace the (−2)-multiplying circuit 9 with a 2-multiplying circuit and the adder 11 with a subtracter.

As an alternative means, the checking apparatus may be implemented by analog circuits. Concretely, in FIG. 1, the A/D converter 3 is removed, the variable-length delay memories 6 and 8 are replaced with analog delay lines having variable delay times, the adders 10 and 11 are replaced with an analog adder, the (−2)-multiplying circuit 9 is replaced with a double-gain reverse amplifier, and the comparator 12 is replaced with an analog comparator.

Figure 3A:
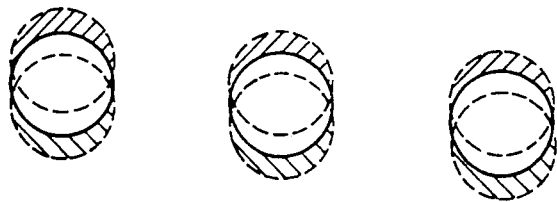
FIG. 3A is an explanatory view showing an apparatus for checking for a pseudo defect on a CRT screen when considering an inclination.
Figure 3B:
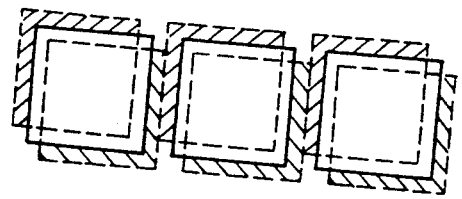
FIG. 3B is an explanatory view showing an apparatus for checking for a pseudo defect on a LCD screen while considering an inclination.
Figure 4:
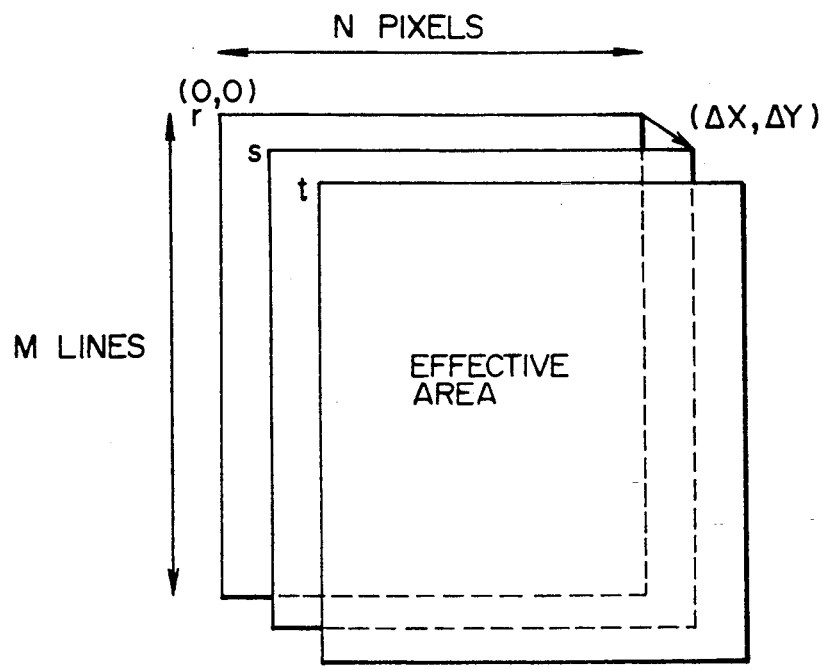
FIG. 4 is an explanatory view showing an effective area of an image signal in the case of $\theta < 0$.
Figure 5:
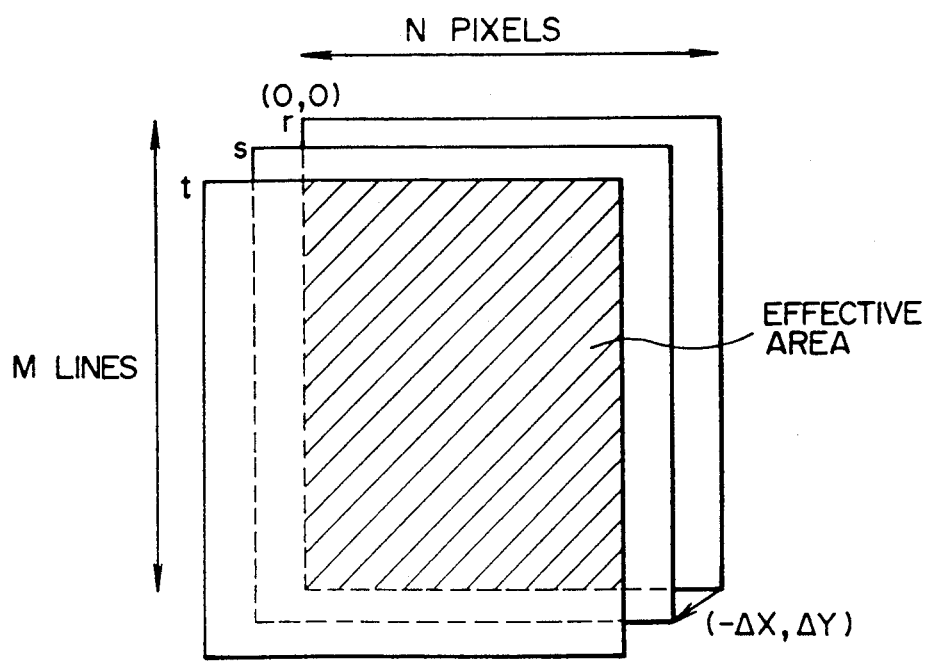
FIG. 5 is an explanatory view showing an effective area of an image signal in the case of $\theta > 0$.

Then, consider the disadvantage provided if the pixel of the display screen is smaller than that of the imaging camera as shown in FIGS. 2A and 2B. The disadvantage results from an erroneous detection based on the relative inclination between the display screen and the imaging camera. FIG. 3A concerns a CRT and FIG. 3B concerns a LCD element. The relative inclination between the CRT and the LCD may allow a non-defective portion shown by oblique lines to be detected as a defect (pseudo defect). To prevent this, the pixels are shifted in the oblique direction. FIGS. 4 and 5 show the inclination $\theta<0$ and the oblique shifting of $\theta>0$. In FIGS. 4 and 5, the number of the horizontal pixels of the imaging camera is N, the number of the vertical lines is M, the upper left corner of the screen is assumed as an origin (0, 0), the horizontal coordinate is X, and the vertical coordinate is Y. The signals r, s and t shown in FIGS. 4 and 5 correspond to the signals a, b and c shown in FIG. 1 and the signals L, C and R shown in FIG. 2. In FIG. 4, the shifting amount is $(\Delta X, \Delta Y)$. The area where the signals r, s and t are all effective is a square area where an upper left corner is $(2\Delta X, 2\Delta Y)$ and a lower right corner is $(N-1, M-1)$ on the coordinate about the signal r. If the delay amount to be predetermined in the register (DLRG) 7 is $N\Delta y + \Delta x$ and the coordinate value of the detected defect is (x, y) on the coordinate about the signal r, the actual coordinate value of the defect is $(x-\Delta x, y-\Delta y)$ on the coordinate about the signal r. In FIG. 5, the shifting amount is $(-\Delta x, \Delta y)$ and the area where the signals r, s and t are all effective is a square area where the upper left corner is $(0, 2\Delta y)$ and the lower right corner is $(N-1-2\Delta x, M-1)$ on the coordinate about the signal r. If the delay amount to be predetermined in the register (DLRG) 7 shown in FIG. 1 is $N\Delta y - \Delta X$ and the actual coordinate value of the detected defect is $(x+\Delta x, y-\Delta y)$ on the coordinate about the signal r.

Figure 6A:
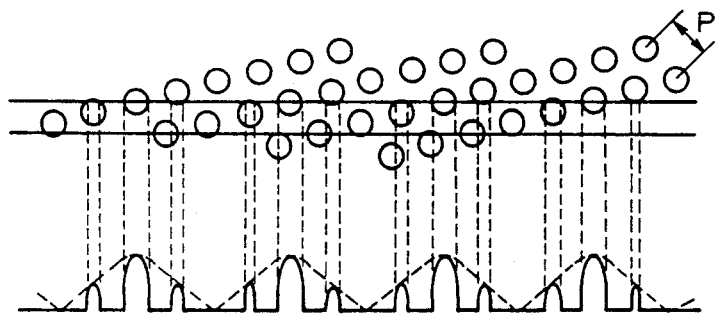
FIGS. 6A and 6B are principle views showing how an inclination is measured on the CRT.
Figure 6B:
Figure 6C:
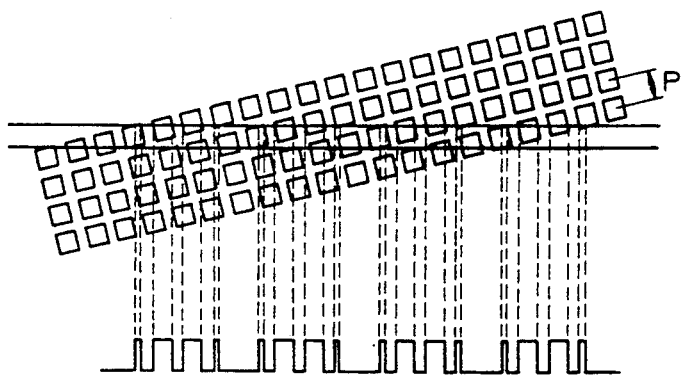
FIGS. 6C and 6D are principle views showing how an inclination is measured on the LCD.
Figure 6D:

FIGS. 6A and 6B show the principle on which the inclination is measured about the CRT and FIGS. 6C and 6D show the principle about the LCD display element. Observing the brightness on the horizontal line inside of the imaging camera as establishing the inclination, the periodic variation of the brightness based on the original pixel ranges is modulated by the periodic variation resulting from the inclination. By obtaining a spatial frequency (beat frequency) about the brightness variation resulting from the relative inclination, therefore, it is possible to specify an absolute value of the inclination. As shown in FIGS. 6A and 6D, assuming that p denotes the number of pixels of the imaging camera corresponding to the vertical range pitch and n is the number of pixels of the imaging camera corresponding to one period of a beat frequency, an absolute value of the inclination $\theta$ can be calculated by the following expression only if the inclination is small enough to establish $\tan\theta \approx \theta$.

$$|\theta| = p/n \ [rad] \quad (1)$$

Assuming that the number of periods in the N pixels is a spatial frequency f and the beat frequency is fb, $|\theta|$ can be calculated by the following expression.

$$|\theta| = (fb \times p)/N \ [rad] \quad (2)$$

The sign of the inclination is determined by the phase lead or lag of the beat frequency fb shown in FIGS. 6B and 6D relative to the beat frequency fb of the brightness on the adjacent two horizontal lines inside of the imaging camera as shown in FIGS. 6A and 6C. In the case of $\theta > 0$ shown in FIG. 5, the phase difference of a lower horizontal line is positive if the upper horizontal line is considered as a criteria In the case of $\theta < 0$ shown in FIG. 4, the phase difference is negative in the same condition.

Figure 7:
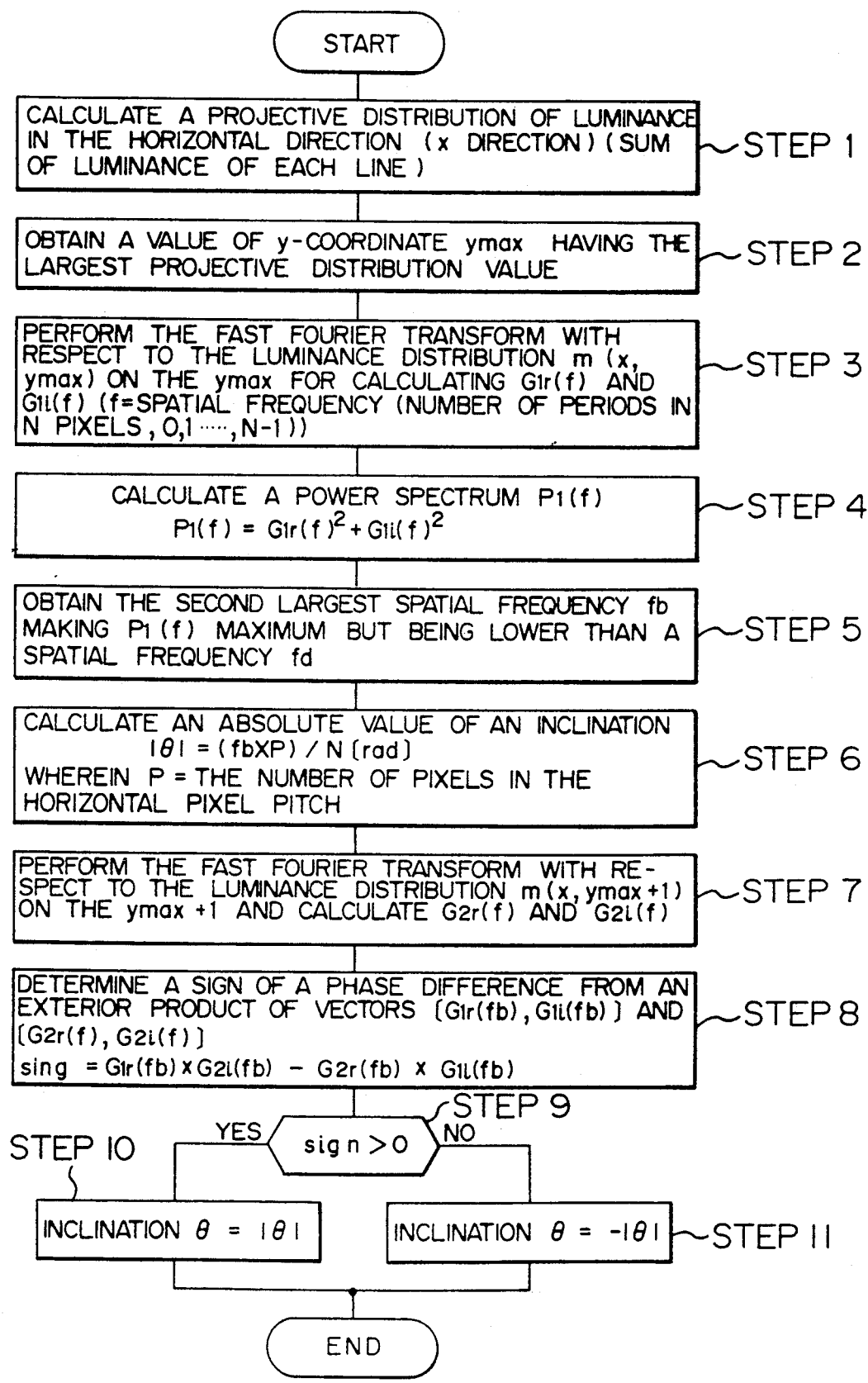
FIG. 7 is a flowchart illustrating how an inclination is measured.

FIG. 7 is a flowchart showing a specific algorithm shown in FIGS. 6A to 6D. At a step 1, the projective distribution of the horizontal brightness is calculated out in any square area of a viewpoint of the imaging camera. At a step 2, the process is executed to obtain a y-coordinate value ymax having the maximum projective distribution value. At a step 3, the fast Fourier transform is carried out on the brightness distribution m(x, ymax) ($0 \leq x < N$) on the ymax. The real part G1r(f) and the imaginary part G1i(f) of the Fourier transform are calculated with respect to the spatial frequency f (f=0, 1,., N−1). At a step 4, a power spectrum P1(f)=G1r(f)$^2$+G1i(f)$^2$ is calculated. At steps 5 and 6, the process is executed to extract the spatial frequency corresponding to the second largest power spectrum among the power spectra generated on the image ranges of the imaging camera as the spatial frequency (beat frequency) of the brightness variation resulting from the relative inclination. Then, with the expression (2), an absolute value of the inclination is calculated. At a step 7, the fast Fourier transform is carried out with respect to the horizontal line one lower than the line of ymax so as to obtain the real part G2r(fb) and the imaginary part G2i(fb) of the Fourier transform obtained with respect to the beat frequency fb. At steps 8, 9, 10 and 11, the sign of the phase difference is determined as a sign of an exterior product of two vectors [G1r(fb), G1i(fb)] and [G2r(fb) and G2i(fb)].

The aforementioned process results in being able to calculate the inclination $\theta$ and obtain the shifting amount according to the inclination $\theta$.

As a transformation of this embodiment, a plurality of detecting systems may be provided on the overall surface of the display screen. Those detecting systems serve to detect defects on the screen at the time for the purpose of implementing a rapid detection. As another arrangement, one or more detecting systems may be added to this embodiment so that those detecting systems are allowed to be moved over the overall surface of the display by means of a table or a robot. This arrangement makes it possible to implement the detection of a defect on the screen without having to increase the number of the detecting systems according to the size of the display screen to be checked.

As set forth above, the checking apparatus according to this invention is capable of clearly identifying the difference in signal level between a defect portion and a normal portion on the screen for the purpose of realizing a highly accurate and rapid detection of a defect without being adversely affected by moire fringes, foreign matters, bubbles and any relative inclination.

The checking apparatus of the present invention is capable of clearly identifying the difference of a signal level between a defect portion and a normal portion on the screen in detecting a defect such as a defective pixel or dotted defect on a CRT or a LCD element. This results in bringing about an effect that a subtle defect can be detected stably and with good sensitivity. Moreover, the checking apparatus makes it possible to avoid the detection leakage and erroneous detection resulting from the moire fringes appearing between the pixels of the display screen to be checked and those of the imaging camera, foreign matter, such as dirt located on the surface of the display screen, or the bubbles formed inside of a glass plate between the pixels and the surface of the display screen. Hence, this apparatus can surprisingly improve the reliability of the detection.

As another advantage, the checking apparatus of this invention is capable of stably detecting a defect without being adversely affected by the relative inclination between the display screen to be checked and the imaging camera. This advantage makes it possible to somewhat roughly do relative positioning between the display screen and the imaging camera, resulting in a reduction of the cost of the system and an improvement in the practical reliability thereof. Furthermore, this checking apparatus provides an advantage of keeping the rapid detection, because the apparatus makes it possible to perform the main adjustment of the inclination with the hardware and the measurement of the inclination with as few as two one-dimensional fast Fourier transforms. The checking apparatus is capable of operating plural detecting systems at the same time so that the overall surface of the display screen is allowed to be rapidly checked for a defect. As another advantage, the detecting apparatus does not necessarily increase the detecting systems in number according to the size of the display screen because it may use a movable detecting system. Hence, this apparatus is capable of building the overall detecting system while keeping the detecting time and the cost constant if a large display screen is to be checked.

What is claimed is:

1. A method of identifying positions of pixel defects on a display screen, comprising the steps of:
    a) picking up an image of said display screen having a plurality of pixels by using an imaging camera having a plurality of pixels to produce an image signal,
    said imaging camera serving to pick up an expansive image of said display screen so that the pixels of said display screen are made at least twice as large as those of said imaging camera for the purpose of preventing moire fringes caused between the pixels of said display screen and those of said imaging camera and so that a focal-point depth of an imaging optical system is made shorter for preventing a focal point from being formed on a foreign matter on the surface of said display screen and a bubble located inside of said display screen;

b) shifting said image signal of said imaging camera in one and another directions by one pixel of said display screen from said image signal;

c) determining a sum of a signal level obtained from the image signal of said imaging camera, a signal level obtained from shifting the image signal by one pixel of said display screen in one direction, and a signal level obtained from shifting the image signal by one pixel of said display screen in another direction; and d) comparing said sum with a predetermined signal level to identify a position of a defective pixel.

2. A method as claimed in claim 1, wherein said step c) includes a step of adding a first signal level obtained from said imaging camera when shifting the image signal of said imaging camera corresponding to a first pixel of said display screen by one pixel in one direction, to a second signal level obtained from said imaging camera when shifting the image signal of said imaging camera by one pixel in another direction, and determining a signal level obtained from subtracting a doubled third signal level obtained from said first pixel of said imaging camera from said added result, if the first pixel of said display screen has a lower luminance than the other pixels.

3. A method as claimed in claim 1, wherein said step c) includes a step of adding a first signal level obtained from said imaging camera when shifting the image signal of said imaging camera corresponding to a first pixel of said display screen by one pixel in one direction, to a second signal level obtained from said imaging camera when shifting the image signal of said imaging camera by one pixel in another direction, and determining a signal level obtained from subtracting said added result from a doubled third signal level obtained from said first pixel of said imaging camera, if the first pixel of said display screen has a higher luminance than the other pixels.

4. A checking method as claimed in claim 1, wherein after said imaging camera picked up an expansive image of said display screen at said step a), if a relative inclination appears between said display screen and imaging camera located in opposition, any one of said display screen and said imaging camera is shifted along the surface of said pixels for amending said inclination.

5. A checking method as claimed in claim 1, wherein the shifting amount provided when any one of said display screen and said imaging camera is shifted along the image signal can be obtained by the steps of:

performing a Fourier transform with respect to the brightest horizontal line contained inside of any square area of the imaging data obtained from said imaging camera;

storing power spectra of spatial frequencies according to the variable brightness of said horizontal line as real parts and imaginary parts of said Fourier transforms;

extracting the spatial frequency corresponding to the second largest power spectrum among said power spectra as a beat frequency and deriving an absolute value of an inclination standing for a relative inclination between said display screen and said imaging camera from said beat frequency; and determining a phase lead or a phase lag of said beat frequency between the brightest horizontal line an the horizontal line closest to said brightest line from a sign determined on an exterior product of a vector represented by the real part and the imaginary part of the Fourier-transformed beat frequency of said brightest horizontal line and a vector represented by the real part and the imaginary part of the Fourier-transformed bet frequency of the horizontal line closest to said brightest line and deriving a sign of said inclination based on said determined phase lead or lag.

6. An apparatus for identifying positions of pixel defects on a display screen, comprising:

an imaging camera;

a display screen having a plurality of pixels to be imaged by said imaging camera;

signal operating means for deriving a sum of a signal level obtained from the image signal of said imaging camera, a signal level obtained from shifting the image signal of said imaging camera by one pixel of said display screen in one direction, and a signal level obtained from shifting the image signal of said imaging camera by one pixel of said display screen in another direction;

means for determining if the pixel of said display screen is defective, based on the sum of the signal levels provided from said signal operating means;

means for amending a relative inclination between said display screen and said imaging camera, said amending means comprising:

means for performing a Fourier transform with respect to the brightest horizontal line contained in any square data of the imaging data obtained from said imaging camera;

means for storing power spectra of spatial frequencies according to the variable brightness of said horizontal line as real parts and imaginary parts of said Fourier transforms;

means for extracting the spatial frequency corresponding to the second largest power spectrum among said power spectra as a beat frequency and deriving an absolute value of an inclination standing for a relative inclination between said display screen and said imaging camera from said beat frequency; and means for determining a phase led or a phase lag of said beat frequency between the brightest horizontal line and the horizontal line closest to said brightest line from a sign determined on an exterior product of a vector represented by the real part and the imaginary part of the Fourier-transformed beat frequency of said brightest horizontal line and a vector represented by the real part and the imaginary part of the Fourier-transformed beat frequency of the horizontal line closest to said brightest line and deriving a sign of said inclination based on said determined phase lead or lag.

7. An apparatus as claimed in claim 6, wherein said signal operating means serves to add a first signal level obtained from said imaging camera when shifting the image signal of said imaging camera corresponding to a first pixel of said display screen by one pixel in one direction, to a second signal level obtained from said imaging camera when shifting the imaging signal of said imaging camera by one pixel in another direction, and to determine a signal level obtained from subtracting a doubled third signal level of said first pixel obtained from said imaging camera from said added result, if the first pixel of said display screen has a lower luminance than the other pixels.

8. An apparatus as claimed in claim 7, wherein said signal operating means serves to add a first signal level obtained from said imaging camera when shifting the image signal of said imaging camera corresponding to a first pixel of said display screen by one pixel in one direction, to a second signal level obtained from said imaging camera when shifting the image signal of said imaging camera by one pixel in another direction, and to determine a signal level obtained from subtracting said added result from a doubled third signal level obtained from said first pixel of said imaging camera, if the first pixel of said display screen has a higher luminance than the other pixels.

9. An apparatus as claimed in claim 6, wherein said signal operating means includes a delay register for storing a predetermined delay amount, a first delay storing circuit for storing first digital video signal obtained from said imaging camera and supplying a second video signal delayed by said delay amount, a second delay storing circuit for storing said second video signal and supplying a third video signal delayed from said second video signal by said delay amount, a first adder for adding said third video signal to said first video signal and supplying a fourth video signal delayed from said first video signal by the doubled delay amount, a ($-2$)-multiplying circuit for doubling the delay amount of said second video signal, adding a minus sign to said doubled amount for producing a fifth video signal, and supplying said fifth video signal, and a second adder for adding said fifth video signal to said fourth video signal for producing a sixth video signal and supplying said sixth video signal.

* * * * *